May 23, 1950

C. TROTTER ET AL 2,508,899

TIME-LOCKING INSTRUMENT FOR SURVEYING INCLINATION
AND DIRECTION OF BORE HOLES

Filed Aug. 9, 1946

Inventors:
Charles Trotter and Yrjo Pajari

By Alex. E. MacRae

Attorney.

Patented May 23, 1950

2,508,899

UNITED STATES PATENT OFFICE 2,508,899

TIME-LOCKING INSTRUMENT FOR SURVEYING INCLINATION AND DIRECTION OF BOREHOLES

Charles Trotter and Yrjo Pajari, Sudbury, Ontario, Canada

Application August 9, 1946, Serial No. 689,464
In Canada May 14, 1946

9 Claims. (Cl. 33—205)

This invention relates to instruments for surveying bore-holes, and more particularly to a type of instrument which can be adjusted to lock in a fixed position after a predetermined lapse of time so that readings may be observed to determine the direction and inclination of a bore-hole.

The object of this invention is to provide an instrument of preciseness which will accomplish accurate surveying of a bore-hole with greater speed and facility than those hitherto proposed.

To this end, the invention contemplates the provision of an instrument wherein a time-piece movement is employed having certain novel attachments which may be adjusted to lock a compass needle and coincidentally to lock an inclination indicator after a predetermined period of time has elapsed so that readings may be observed to determine the inclination and direction of a bore-hole. The invention also contemplates the provision of an instrument possessing novel structural details whereby ease of manufacture, assembly and operation are accomplished.

Figure 1:
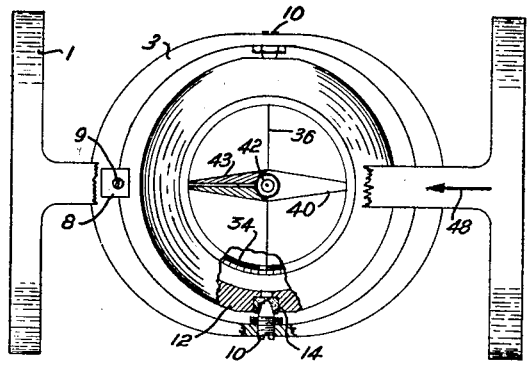
Figure 5:
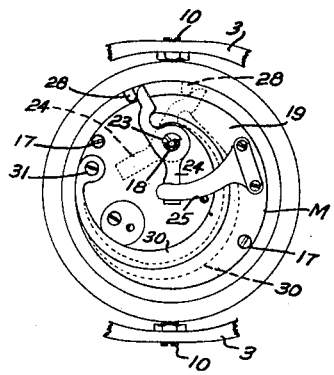
Figure 2:
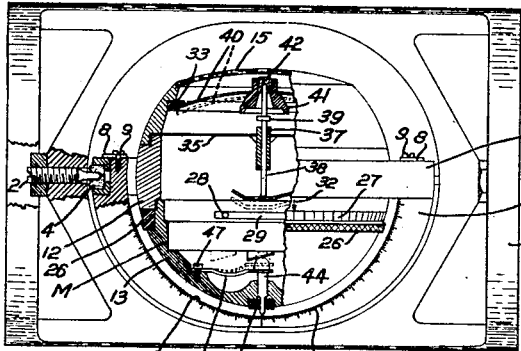
Figure 3:
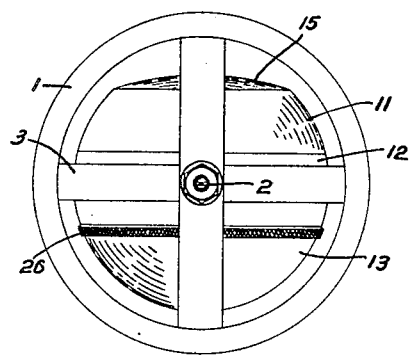
Figure 4:
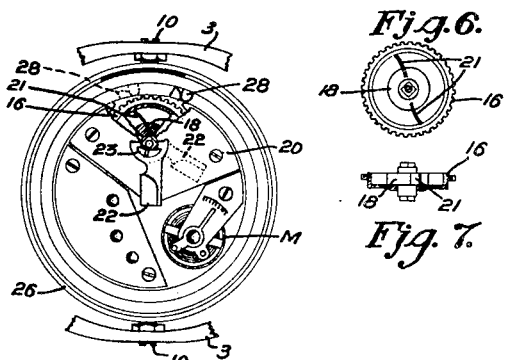
Figure 6:
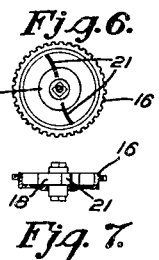
Figure 7:
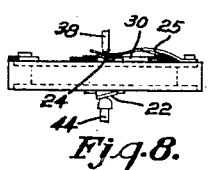
Figure 8:
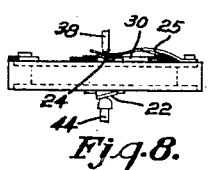

Further objects, advantages and details of the invention will be apparent from the following description with particular reference to the accompanying drawing, in which Figure 1 is a plan view of the instrument, partly fragmentary, Figure 2 is a side elevation, partly fragmentary, Figure 3 is an end elevation, Figure 4 is a bottom view of the time-piece movement, partly fragmentary, Figure 5 is a top view of the time-piece movement, Figure 6 is a plan view of a time-piece driving gear and associated elements, Figure 7 is a sectional elevation of the detail shown in Figure 6, and Figure 8 is an elevation, partly in section of the time-piece movement.

Referring to the drawing 1 is an outer frame both ends of which are cylindrical in shape having a flat middle portion extending between the two cylindrical ends, the flat faces of which are in a plane parallel with the axis of the cylindrical end portions and equally distant on either side of the axis, and having a substantially oval aperture centrally located in the frame having its major axis coordinately with the axis of the cylindrical end portions.

Adjustable bearing pins 2 are mounted in the relatively thick ends of the frame 1 and positioned precisely axially with the cylindrical ends.

An arrow 48 is impressioned on the outer surface of the frame which may be as indicated in Figure 1 of the drawing so as to distinguish the direction in which the instrument is inserted in the bore-hole and to which further reference will be made as the description proceeds.

An inner frame 3 is provided which is substantially an oval ring whose outside dimensions are slightly smaller than the oval aperture in frame 1 and having an inner shape proportioned so as to make the ring gradually thicker at either end of the major axis and having bearings 4, preferably jewels, seated axially on its major axis.

Centrally positioned and in line with the major axis of frame 3 and at right angles to its flat face is mounted thereon a protractor 5 which has its outer shape conforming in semi-ovality to the outer oval shape of frame 3 and in slightly spaced relation to the oval aperture in frame 1 and its inner shape semicircular, having grooves 6 impressioned on its inner surface at each degree division of its inner periphery and graduation lines 7 impressioned on at least one side of its flat surface extending radially and coordinately with the grooves 6 so as to facilitate reading of angles. The graduation lines 7 may be of varying length so as easily to distinguish each five degree division.

The protractor portion 5 may be notched into the inner frame 3 and held securely in position by the clamps 8 and screws 9.

The assembled inner frame 3 and protractor portion 5 are pendulously suspended within the outer frame 1 on the adjustable bearing pins 2 seated in the jewel bearings 4 and adjusted freely to oscillate within the frame 1.

Centrally positioned on the minor axis of the inner frame 3 and threaded therethrough are two adjustable bearing pins 10 and pendulously supported therein is a substantially spherical case constructed in three parts namely upper part 11 and threaded thereto middle part 12 and threaded thereto lower part 13 and having bearings 14 preferably jewel, securely seated into the middle portion 12 and positioned diametrically opposite.

Closely fitting the circular aperture in the upper portion of the spherical case 11 a glass disc 15 is provided which may also be made of any suitable transparent material not easily broken, for instance, plastic.

Closely fitting an annular recess in the lower spherical portion 13 a time-piece movement M is provided, such as is commonly used in a wrist watch but having certain novel features which will now be described.

Referring to Figure 4 of the drawing the timepiece movement M is located within the lower spherical portion 13 in a position so that the axis of the driving gear 16 will be in direct line with the axis of the bearing pins 10 and is secured in this position by the screws 17 as shown in Figure 5 of the drawing.

Axially mounted through the driving gear 16 an axle 18 is provided rotatably held in position between the upper plate 19 and the lower plate 20 of the time-piece movement. The upper and lower ends of the axle 18 are made square in section for a relatively short length protruding through the upper and lower plates 19 and 20 of the time-piece movement and thence the axle is circular in section for a relatively short length on either end, forming journals which may also be described as bearings and such bearing parts dimensioned rotatably to fit receiving holes in the upper and lower time-piece plates 19 and 20. The central portion of the axle 18 is relatively larger in diameter forming a boss which positions the axle lengthwise within the driving gear 16. On either end of the axle 18 holes are drilled and tapped to receive the screws 23. The conventional main-spring which is usually encased within the driving gear 16 of the time-piece movement is removed therefrom and is discarded.

Two relatively thin metal strips 21 rectangular in configuration are fitted securely in receiving slots in the relatively larger middle portion of the axle 18 an positioned diametrically opposite each other being precisely proportioned in length so that when the outer flexible ends are slightly bent in curved shape they will exert slight outward pressure against the inner wall of the driving gear 16 so that they will slidably rotate inside the driving gear when rotated in one direction but will tighten sufficiently against the inner wall of the driving gear when rotated in the opposite direction so as to cause rotation of the driving gear and thereby operate the mechanism of the time-piece movement with results which will be described in more detail as this description proceeds.

On the lower squared end of the axle 18 is mounted a protractor locking lever 22 having a square aperture to fit closely the squared lower end of the axle 18 and securely held thereon by the screw 23 and having its outer end formed in a wedge shape so that as it moves in an arc from the position shown in dotted lines in Figure 4 of the drawing it will have a downward pushing effect on any movable object in its path.

Referring to Figures 5 and 7 of the drawing a compass locking lever 24 is provided having a particular shape in configuration as shown in the drawing and having a square aperture to fit closely the squared upper end of the axle 18 and securely held thereon by the screw 23. The inwardly extending end of the lever 24 is formed in a wedge shape so that as it moves in an arc from the position shown in dotted lines it will have an upward lifting effect on any movable object in its path.

A compass locking spring 25 of relatively thin flexible metal and shaped in plan view as shown in Figure 5 of the drawing is securely fastened to the upper plate 19 of the time-piece movement and positioned so that the unsupported pliable end is directly over the central perpendicular axis of the time-piece movement and curved downward so as to be in close proximity to the upper plate 19 and having a slightly upward curve at its extreme end so as readily to engage with the wedge shaped part of the lever 24 and be lifted upward as the lever 24 moves in an arc under it.

A timing ring 26, movably fitting in an annular groove formed between the lower and middle parts 13 and 12 of the spherical case, has a relatively narrow portion of its outer periphery protruding outwardly from the surface of the spherical case and preferably knurled so as to facilitate rotation by finger and thumb and having graduation lines 27 impressioned on the upper part of its periphery to indicate intervals of time, preferably five minute intervals. The purpose of these lines will be more fully explained as the description proceeds.

A driving pin 28 is securely fastened into the timing ring 26 and protrudes inwardly through a slotted aperture 29 extending around the periphery of the lower part 13 of the spherical case and proportioned to allow the driving pin to be moved in an arc and engage with the lever 24 and move it in an arc about the axle 18 to a position which may be as shown in dotted lines in Figure 5 of the drawing.

A driving spring 30 of substantially crescent like shape in plan view and made of adaptable spring material such as beryllium alloy is securely fastened at one end to the upper plate 19 of the time-piece movement by the screw 31 having its movable end of a shape to form a socket like fitting in a substantially semicircular recessed portion of the lever 24 so that as the lever 24 is moved in an arc by the timing ring 26 and in engagement with the driving pin 28 it will distend the driving spring 30 to a position as shown in dotted lines in Figure 5 of the drawing. The driving spring is thus given tensive state having sufficient energy to cause the lever 24 to move in an arc about the axle 18 revolving the said axle 18 and causing the metal strips 21 to be expelled against the inner walls of the driving gear 16 and thus revolving the driving gear 16 which operates the time-piece movement. The peripheral distance through which the timing ring is moved thus determines the amount of rotary movement transmitted to the driving gear 16 by the driving spring 30 through the lever 24 and the axle 18 and the metal strips 21 and this peripheral distance may be the more conveniently determined by the graduation lines 27 on the timing ring 26 and a coinciding zero line 32 impressioned on the adjacent middle part 12 of the spherical case. It will be noted that the lever 22 attached to the lower end of the axle 18 will move through a corresponding arc with that of the lever 24 attached to the upper end of the axle 18 and these two levers are positioned on the axle so that their wedge shaped ends are in direct alignment perpendicularly.

Referring to Figure 2 of the drawing a ring 33 is provided having a flat upper surface and relatively wedge shaped in section and its outer diameter proportioned to fit closely a receiving annular recess in the upper spherical part 11. Graduation lines 34 are impressioned on the upper flat surface at each degree of its periphery which lines may be of varying length so as to distinguish each five degree division as shown in fragmentary view in Figure 1 of the drawing.

Referring to Figure 2 of the drawing a relatively thin metal disc 35 is securely clamped between the faces of upper spherical part 11 and middle spherical part 12 having lines 36 impressioned on its upper surface converging from the centre at ninety degrees and positioned coordinately with the axis of the bearing pins 10 and the axis of the bearing pins 2, the said lines to facilitate reading of the magnetic bearing angle, and having a tubular shaped boss 37 securely fastened axially and concentric with the periphery of the disc 35.

A compass spindle 38 of relatively small diameter is movably fitting through the tubular boss 37 and having a collar 39 of larger diameter so as to limit the distance the spindle 38 will extend through the boss 37.

A magnetic needle 40 is securely mounted on a boss 41 having a bearing 42 preferably jewel securely held therein which pivots on the upper conical end of the spindle 38. The magnetic north end of the needle is coloured, preferably black having a relatively thin line 43 which may be scratched with a sharp instrument extending from its axis centrally to its north end so as to facilitate reading its magnetic bearing with accuracy.

In elevation view the compass needle is slightly curved so as to conform to the contour of the under side of the ring 33 and is proportioned and balanced so that when the collar 39 of the spindle 38 is resting on the upper end of the tubular boss 37 the needle will freely oscillate on the bearing 42 seating on the upper conical end of the spindle 38 and the outer ends of the needle will be in close proximity to, but clear of the under side of the ring 33 when the instrument is in unlocked position as shown by the dotted lines in Figure 2 of the drawing.

A protractor locking pin 44 is provided having a slightly larger hemispherical upper end and a lower end made rectangular in section slidably to fit through a rectangular aperture in the disc 45 and having a wedge shaped point readily to seat in the grooves 6 on the inner periphery of the protractor part 5.

The disc 45 is a press fit in a receiving annular recess concentrically positioned on the vertical axis of the lower part 13 of the spherical case having a rectangular aperture extending lengthwise with the grooves 6 so that the wedge shaped point of the locking pin 44 will readily seat in the grooves 6.

A spring 46 is securely fastened at one end to the inner wall of the lower spherical part 13 by the screw 47 having its pliable end fork shaped so as to engage under the hemispherical upper end of the pin 44 and press it upwards so that the wedge shaped point of the pin 44 will be clear of the grooves 6 when the instrument is in unlocked position as shown by the dotted lines in Figure 2 of the drawing.

The assembled spherical case with the timepiece movement and accessory mechanism housed therein pendulously suspends on the adjustable bearing pins 10 seating in the jewel bearings 14 and is balanced so that the wedge shaped point of the protractor locking pin 44 is in precisely vertical line with the axis of the bearing pins 10 after the fashion of the plumb bob.

In describing the operation of the instrument let it be assumed a bore-hole is to be surveyed at a depth of five hundred feet. An estimate of the time required to lower the instrument to this depth is readily made from experience and assuming that an estimated time of twenty minutes is required the timing ring 26 is rotated through an arc of five divisions of the graduation lines 27 and then reversibly rotated back to its neutral position. This movement of the timing ring represents a time period of twenty-five minutes, allowing twenty minutes for the lowering operation and a further five minutes during which the compass needle 40 and the protractor locking pin 44 may settle in a position of repose.

The instrument is now in unlocked position and is inserted in a container made of brass or other non-magnetic substance such as is widely employed in bore-hole surveying, having the arrow 48 pointing towards the end or bottom of the bore-hole. The container may be connected to the drill rod string having a length of drill rod made of brass or other non-magnetic material and preferably at least five feet in length connected between the container and the drill rods so as to separate the instrument from possible magnetic attraction of the steel drill rods. In relatively steeply inclined or vertical bore-holes the lowering and raising of the container may be accomplished by means of a wire and reel but either method may be employed since it is not a requisite feature of the instrument that it must be prevented from rotating during the lowering or raising operation.

The container with the instrument enclosed therein is lowered to the desired depth in the bore-hole and is allowed to remain at rest until a period of time has elapsed slightly in excess of the period for which the timing ring is set. For instance, in the operation described the timing ring is set at twenty-five minutes so that a period of say twenty-seven minutes may be allowed to elapse before disturbing the instrument.

When the timing ring is moved through the arc as described the pin 28 engages with the lever 24 and rotates it about the axle 18 and also distends the driving spring 30.

During the interval of time for which the timing ring is set the driving spring 30 will push the lever 24 in an arc about the axle 18 and coincidentally the lever 22 which is attached to the lower end of the axle 18 will rotate in a similar arc. The metal strips 21 attached to the boss of the axle 18 engage with the inner walls of the driving gear 16 and rotate the gear in an arc of sufficient rotation to operate the mechanism of the time-piece movement for twenty-five minutes. Nearing the end of this period of time the levers 22 and 24 have moved in an arc so that their wedge shaped ends are moving in an arc through the vertical axis of the spherical case at which time the compass locking lever 24 moves under the compass locking spring 25 causing it to lift upwards forcing the compass spindle 38 in an upward direction and thereby raising the compass needle by relatively gentle action so as not to change its magnetic north bearing position and press the outer ends of the needle against the under curved side of the ring 33 thereby locking the compass needle in position. Coincidentally and by a like action the wedge shaped end of the protractor locking lever 22 contacts the hemispherical upper end of the pin 44 forcing it downward so that its wedge shaped point will seat in the nearest opposite groove 6 impressioned on the inner periphery of the protractor part 5 thereby locking it in position.

The instrument is now in its locked position having the compass needle securely held in position to indicate the direction of the bore-hole with relation to magnetic north and the protractor pin 22 securely held in position to indicate the inclination of the bore-hole with relation to a vertical plumb line. The instrument may now be removed from the bore-hole and the angle of inclination of the bore-hole may be determined by observing the position of the protractor locking pin with relation to the protractor graduation lines 7 and the direction of the bore-hole may be determined by observing the position of the compass needle with relation to the graduation lines 34 on the ring 33. The arrow 46 impressioned on the frame 1 indicates the direction in which the instrument is inserted in the bore-hole so that readings are observed in relation thereto.

There has thus been provided an instrument by means of which the inclination and direction of bore-holes, and the like, may be determined accurately and rapidly by a simple and easy method of accomplishment.

In the accompanying drawing are illustrated several modes for the practical application of the principles of this invention but it will be understood that changes and alterations may be made in these exemplifying structures, within the scope of our claims, without departing from the principles of the invention.

We claim:

1. In a surveying instrument of the type described, a case, a time-piece movement encased within the case, said time-piece movement having a driving gear, an axle within the driving gear, a plurality of flexible fins extending radially from the said axle, the said fins shaped and proportioned so as slidably to rotate within the driving gear when the axle is rotated in one direction and to engage clutch-like with the driving gear when the axle is rotated in the opposite direction thereby transmitting the driving torque to the driving gear.

2. In a surveying instrument of the type described having an outer frame, an inner frame pendulously suspended from the outer frame, and a case pendulously suspended from the inner frame, a time-piece movement encased within the case, a driving gear, an axle within the driving gear, a plurality of flexible fins extending radially from the said axle, the said axle being operable frictionally to transmit torque to the driving gear in one direction and slidably rotate within the driving gear in the opposite direction, a protrusile pin carried by the case, a protractor locking lever attached to the axle, said lever being shaped and located for co-action with a protrusile pin, a protractor having grooves on its inner periphery to receive the said protrusile pin, means to eject the said protrusile pin whereby the spherical case is locked in its pendulously static position within the protractor, said protractor being integral with the inner frame, means to retract the said protrusile pin to allow free pendulous action of the spherical case within the protractor.

3. In a surveying instrument of the type described, a case, a time-piece movement therein having a driving gear, an axle within the driving gear, and a plurality of flexible fins to co-engage frictionally the axle with the driving gear in one direction of rotation and slidably rotate within the driving gear in reverse rotation, a compass locking lever attached to the axle, a compass locking spring engaging the said lever, a spindle, a compass needle pivoted on the spindle, a boss, said spindle being upwardly movable through said boss, a collar on the said spindle providing abutment against the said boss to position the spindle whereby the needle is in free swinging position, a graduated ring positioned in a horizontal plane above the path of the needle, means to raise the spindle to press the compass needle against the underside of the graduated ring and hold the same in fixed position.

4. In a surveying instrument as described, a time-piece movement, a driving gear, an axle, a plurality of radial fins engaging the axle with the driving gear, a lever attached to the axle, a driving spring, means to engage the lever with the driving spring and tensively distend the said driving spring to cause rotary motion of the driving gear while receding from its tensively distended position.

5. In a surveying instrument as described, a time-piece movement having a driving gear, an axle, a plurality of radial fins carried by the axle and engageable with the gear to drive it in one direction only, a compass locking spring, a compass locking lever engaging said spring, an upwardly adjustable compass spindle, a compass needle on the spindle, said spring engaging said spindle, a graduated ring positioned in a horizontal plane above the needle, means responsive to rotation of the driving gear to raise the said spindle and press the compass needle against the underside of the said graduated ring, a protrusile and retractile pin, a protractor having pin receiving grooves therein, means responsive to rotation of the driving gear for ejecting said pin to engage in the receiving grooves, means for retracting said pin free of the protractor, a timing ring rotatable through an arc measured in graduated divisions of its periphery, a lever carried by the axle and engageable with the timing ring for movement therewith, and a driving spring for imparting rotative movement to the axle to drive the gear.

6. In a surveying instrument of the type described, a case, a time-piece movement encased within the case, said time-piece movement having a driving gear, an axle within the driving gear, clutch means for transmitting driving torque from the axle to the gear on rotation of the axle in one direction and releasable to permit relative rotation of the axle with respect to the gear on rotation of the axle in the opposite direction, a driving spring mounted on the case, and a lever fixed to the axle and engageable with the spring, said lever on swinging movement thereof being adapted to impose driving tension on the spring.

7. A surveying instrument, as defined in claim 6, said lever having a notch therein, said spring being substantially crescent-shaped and having one end fixed to the case and its other end freely engaging said notch.

8. A surveying instrument as defined in claim 6, including a member mounted on said case for peripheral rotative movement with respect thereto, and means carried by the member and engageable with said lever to impart swinging movement thereto.

9. In a surveying instrument of the type described, an outer frame, an inner frame pivotally suspended from and about an axis of the outer frame, a case pivotally suspended from and about an axis of the inner frame at right angles to the first axis, a compass having a spindle reciprocally mounted in the case and a needle on the spindle, a graduated ring positioned in the case in a horizontal plane above the needle, a time-piece movement mounted in the case and having a driving gear, an axle, and means carried by the axle and engageable with the gear to drive it in one direction only, means responsive to rotation of the driving gear to raise the spindle and press the needle against the underside of the graduated ring, a protrusile and retractile pin, a protractor carried by the inner frame and engageable by the pin, means responsive to rotation of the driving gear to eject said pin into locking engagement with the protractor, means for retracting the pin free of the protractor, a timing ring rotatable through an arc measured in graduated divisions of its periphery, a lever carried by the axle and engageable with the timing ring for movement therewith, and a driving spring imparting rotative movement to the axle to drive the gear.

CHARLES TROTTER.
YRJO PAJARI.

REFERENCES CITED

The following references are of record in the file of this patent:

UNITED STATES PATENTS

| Number | Name | Date |
|---|---|---|
| 963,242 | Osterberg | July 5, 1910 |
| 1,152,701 | Barresen | Sept. 7, 1915 |
| 1,786,184 | Woodmansee | Dec. 23, 1930 |
| 1,859,949 | Zublin | May 24, 1932 |